US008055115B2

(12) United States Patent
Morasse et al.

(10) Patent No.: US 8,055,115 B2
(45) Date of Patent: Nov. 8, 2011

(54) OPTICALLY ACTIVE GLASS AND OPTICAL FIBER WITH REDUCED PHOTODARKENING AND METHOD FOR REDUCING PHOTODARKENING

(75) Inventors: Bertrand Morasse, Quebec (CA); Jean-Philippe De Sandro, Quebec (CA); Eric Gagnon, Stoneham (CA)

(73) Assignee: Coractive High-Tech Inc., Quebec, Quebec (CA)

( * ) Notice: Subject to any disclaimer, the term of this patent is extended or adjusted under 35 U.S.C. 154(b) by 211 days.

(21) Appl. No.: 11/773,869

(22) Filed: Jul. 5, 2007

(65) Prior Publication Data
US 2009/0011233 A1    Jan. 8, 2009

(51) Int. Cl.
*G02B 6/00* (2006.01)
(52) U.S. Cl. .................................... 385/142
(58) Field of Classification Search ............ 385/142
See application file for complete search history.

(56) References Cited

U.S. PATENT DOCUMENTS

| 4,033,667 | A | 7/1977 | Fleming, Jr. |
| 4,815,079 | A | 3/1989 | Snitzer et al. |
| 6,154,598 | A | 11/2000 | Gavrilovic et al. |
| 6,495,482 | B1 | 12/2002 | de Sandro et al. |
| 6,636,347 | B1* | 10/2003 | Wang et al. .......... 359/341.5 |
| 6,797,657 | B2* | 9/2004 | Ellison et al. .......... 501/44 |
| 7,046,902 | B2 | 5/2006 | De Sandro et al. |
| 7,477,672 | B2* | 1/2009 | Sinha et al. .......... 372/64 |
| 2001/0010696 | A1 | 8/2001 | Bufetov et al. |
| 2003/0142395 | A1* | 7/2003 | MacCormack et al. ... 359/341.3 |
| 2003/0169489 | A1 | 9/2003 | Jiang et al. |
| 2005/0254764 | A1 | 11/2005 | Chatigny |
| 2006/0029344 | A1* | 2/2006 | Farroni et al. .......... 385/123 |
| 2008/0069508 | A1* | 3/2008 | Dong et al. .......... 385/127 |
| 2009/0016387 | A1* | 1/2009 | Durkin et al. .......... 372/25 |

FOREIGN PATENT DOCUMENTS
EP    0617301 A1    9/1994

OTHER PUBLICATIONS

Laperle, P., L. Desbiens, H. Zheng, M. Drolet, A. Proulx, Y. Taillon, "Relations between phosphorus/aluminum concentration ratio and photodarkening rate and loss in Yb-doped silica fibers", Proc. SPIE 7580, 75801Y (2010); doi:10.1117/12.840026.*
M.M. Broer et al., Opt. Lett, 1993, 18 (10), p. 799-801.
M.M. Broer et al., Opt. Lett. 1991, 16 (18), p. 1391-1393.
E.G. Behrens et al., 1990, JOSA B 7 (8), p. 1437-1444.
R. Paschotta et al., Opt. Commun., 1997, 136 (5-6), p. 375-378.

(Continued)

*Primary Examiner* — Charlie Peng
(74) *Attorney, Agent, or Firm* — Merchant & Gould P.C.

(57) ABSTRACT

An optically active glass and an optical fiber comprising such glass, having reduced photodarkening properties are provided. The optically active glass is mainly composed of silica representing from about 50 to 98 mol % of the glass. It also includes at least one active ion, such as a rear-earth ion, which induces a photodarkening effect in optical properties of the glass. Moreover, the glass includes an effective amount of phosphorus oxide providing the photodarkening reducing effect, preferably in an amount of from about 1 to 30 mol %. A method for reducing a photodarkening effect in optical properties of an optically active glass including the step of introducing phosphorus oxide to the glass is also provided.

23 Claims, 4 Drawing Sheets

OTHER PUBLICATIONS

B. Morasse et al., "Low photodarkening single cladding ytterbium fibre amplifier", Proceedings of SPIE, vol. 6453, Fiber Lasers IV: Technology, Systems, and Applications; Donald J. Harter, Andreas Tünnerman, Jes Broeng, Cliffod Headley III, Editors, 64530H (Feb. 20, 2007).

Kitabayashi et al., "Population Inversion Factor Dependence of Photodarkening of Yb-doped Fibers and its Suppression by Highly Aluminum Doping", Optical Fiber Communication Conference, 2006 and the 2006 National Fiber Optic Engineers Conference; OFC 2006, Mar. 5-10, 2006.

Izawa T. et al., Optical Fibers : Materials and Fabrication, KTK Scientific Publishings Company, Tokyo, 1987.

Koponen J.J. et al., "Measuring photodarkening from single-mobile ytterbium doped silica fibers", Opt. Expr. 14(24), 11539-11544 (2006).

Kirchhof J. et al., "Dopant Interactions in High Power Laser Fibers", Proceedings of SPIE, vol. 5723, p. 261-272 (SPIE Bellinghan, WA, 2005), Optical Components and Materials II, edited by Shibin Jiang, Michel J.F. Digonnet.

Dianov et al., "New generation of Raman fiber lasers, based on phosphosilicate fibers." Conference on Lasers and Electro-Optics Europe, Sep. 10-15, 2000.

Osanai et al., "Effect of Dopants on Transmission Loss of Low-OH-content Optical Fibres." *Electrical Letters*, vol. 12, No. 21 Oct. 14, 1976, pp. 549-550.

Xiong et al., "10-W Raman Fiber Lasers at 1248 nm Using Phosphosilicate Fibers." *Journal of Lightwave Technology*, vol. 21, No. 10, Oct. 2003, pp. 2377-2381.

M.M. Broer, *Studying Pump Light-Induced Darkening in Erbium-Doped Fiber Amplifiers with Optical Time Domain Reflectometry*, IEEE Photonics Technology Letters, vol. 4, No. 11, Nov. 1992.

W.L. Barnes, S. B. Poole, J. E. Townsend, L. Reekie, D. J. Taylor, and D. N. Payne, "Er3+-Yb3+ and Er 3+ Doped Fiber Lasers", Journal of Lightwave Technology, vol. 7. No. 10, pp. 1461-1465, Oct. 1989.

A. L. G. Carter, S. B. Poole and M. G. Sceats, "Flash-Condensation Technique for the Fabrication of High-Phosphorus-Content Rare-Earth-Doped Fibres", Electronics Letters, vol. 28, No. 21, pp. 2009-2011, Oct. 1992.

V. P. Gapontsev, S. M. Matitsin, A.A. Isineev and V. B. Kravchenko, "Erbium Glass Lasers and Their Applications", Optics and Laser Technology, vol. 14, Issue 4, pp. 189-196, Aug. 1982.

D. N. Payne and W. A. Gambling, "New Silica-Based Low-Loss Optical Fibre", Electronics Letters, vol. 10, No. 15, pp. 289-290, Jul. 1974.

J. E. Townsend, S. B. Poole and D. N. Payne, "Solution-Doping Technique for Fabrication of Rare-EarthDoped Optical Fibres", Electronics Letters, vol. 23, No. 7, pp. 329-331, Mar. 1987.

J. E. Townsend, W. L. Barnes and K. P. Jedrzejewski, "Yb3+ Sensitised Er3+ Doped Silica Optical Fibre with Ultrahigh Transfer Efficiency and Gain", Electronics Letters, vol. 27, No. 21, pp. 1958-1959, Oct. 1991.

G. G. Vienne, W. S. Brocklesby, R. S. Brown, Z. J. Chen, J. D. Minelly, J. E. Roman, and D. N. Payne, "Role of Aluminum in Ytterbium-Erbium Codoped Phosphoaluminosilicate Optical Fibers", Optical Fiber Technology, vol. 2, Issue 4, pp. 387-393, Oct. 1996.

P.F. Wysocki, G. Nykolak, D.S. Shenk and K. Eason, "Noise Figure Limitation in Ytterbium-Codoped Erbium-Doped Fiber Amplifiers Pumped at 1064 nm", OFC '96 Technical Digest, pp. 32-33 Feb.-Mar. 1996.

* cited by examiner

OPTICALLY ACTIVE GLASS AND OPTICAL FIBER WITH REDUCED PHOTODARKENING AND METHOD FOR REDUCING PHOTODARKENING

FIELD OF THE INVENTION

The present invention relates to the field of optically active glass and more particularly concerns optically active glass and optical fibers in which photodarkening effects are reduced or eliminated.

BACKGROUND OF THE INVENTION

Optical fiber lasers and amplifiers used in the amplification of optical signals usually include optical fibers having optically active waveguiding cores doped with rare-earth active ions, such as for example, erbium, ytterbium and thulium. For such applications and others, it is important that the optical properties of the fiber remain stable. However, for some rare-earth doped core compositions, the formation of photoinduced structural transformations which can induce excess loss in the doped glass core of the fibers are observed over time under light illumination or propagation, resulting in reduced output power efficiency of the fibers. This phenomenon is known as photodarkening. It is a very detrimental effect, that decreases for instance the output power of fiber laser or amplifier over time and make them inefficient. Photodarkening Photodarkening has already been observed in silica fiber doped with different rare-earth such as thulium (M. M. Broer et al., Opt. Lett. 1993, 18 (10), p. 799-801), cerium (M. M. Broer et al., Opt. Lett. 1991, 16 (18), p. 1391-1393), europium and praseodymium (E. G. Behrens et al., 1990, JOSA B 7 (8), p. 1437-1444). The first experimental evidence of this phenomenon in ytterbium doped silica fiber was described by R. Paschotta et al. in Opt. Commun., 1997, 136 (5-6), p. 375-378.

The present inventors, in their article entitled "*Low photodarkening single cladding ytterbium fibre amplifier*" published in the Proceedings of SPIE, Vol. 6453, Fiber Lasers IV: Technology, Systems, and Applications; Donald J. Harter, Andreas Tünnermann, Jes Broeng, Clifford Headley III, Editors, 64530H (Feb. 20, 2007), show that photodarkening is reduced in ytterbium fibers co-doped with aluminum or with another rare-earth such as erbium. They attribute this reduction of photodarkening to erbium or aluminium ions that prevents the formation of ytterbium clusters to emit UV radiation that creates color centers.

Gavrilovic et al. in U.S. Pat. No. 6,154,598 propose to prevent photodarkening in ytterbium-doped optical fiber lasers and/or waveguide structures operating at high optical output power level and which contain thulium as an impurity, by introducing another rare-earth ion as co-dopant to the fiber core. Preferably, the co-dopants are selected from terbium, europium and/or neodymium.

Kitabayashi et al. have also demonstrated that high aluminum concentration into ytterbium-doped fibers is effective to suppress photodarkening ("*Population Inversion Factor Dependence of Photodarkening of Yb-doped Fibers and its Suppression by Highly Aluminum Doping*", Optical Fiber Communication Conference, 2006 and the 2006 National Fiber Optic Engineers Conference; OFC 2006, 5-10 Mar. 2006).

It is thus apparent to those skilled in the art that there is a need for optical fibers with reduced photodarkening properties, especially for rare-earth-doped optical fiber wherein the rare-earth induces a photodarkening effect. There is also a need for a method which reduces photodarkening in a rare-earth-doped optical fiber wherein the rare-earth induces a photodarkening effect.

OBJECT AND SUMMARY OF THE INVENTION

It is an object of the present invention to provide an optically active glass and an optical fiber having reduced photodarkening properties.

In accordance with a first aspect of the invention, there is provided an optically active glass including from about 50 to 98 mol % of silica, from 0.01 to about 5 mol % of at least one active ion inducing a photodarkening effect in optical properties of the optically active glass, and an effective amount of phosphorus oxide for reducing the photodarkening effect.

In accordance with another aspect of the present invention, there is provided an optically active glass including from about 50 to 98 mol % of silica, from 0.01 to about 5 mol % of $Yb_2O_3$, and from about 1 to 30 mol % of phosphorus oxide.

In accordance with yet another aspect of the present invention, there is provided an optically active glass including from about 50 to 98 mol % of silica, from about 0.3 to 5 mol % of $Yb_2O_3$, and from about 1 to 30 mol % of phosphorus oxide.

In accordance with another aspect of the invention, there is provided an optically active glass including about 90 mol % of silica, about 1 mol % of $Yb_2O_3$, about 1 mol % of $Al_2O_3$, and about 8 mol % of phosphorus oxide.

In accordance with yet another aspect of the invention, there is provided an optical fiber including an optically active glass including from about 50 to 98 mol % of silica, from 0.01 to about 5 mol % of at least one active ion inducing a photodarkening effect in optical properties of the glass, and an effective amount of phosphorus oxide for reducing the photodarkening effect.

In accordance with yet another aspect of the invention, there is provided an optical fiber including an optically active glass including from about 50 to 98 mol % of silica, from 0.01 to about 5 mol % of $Yb_2O_3$, and from about 1 to 30 mol % of phosphorus oxide.

In accordance with yet another aspect of the invention, there is provided an optical fiber including an optically active glass including about 90 mol % of silica, about 1 mol % of $Yb_2O_3$, about 1 mol % of $Al_2O_3$ and about 8 mol % of phosphorus oxide.

In accordance with yet another aspect of the invention, there is provided a method for reducing a photodarkening effect in optical properties of an optically active silica glass including at least one active ion inducing the photodarkening effect. The method includes the step of doping the optically active glass with an effective amount of phosphorus oxide.

Other features and advantages of the present invention will be better understood upon reading of preferred embodiments thereof with reference to the appended drawings.

DETAILED DESCRIPTION OF PREFERRED EMBODIMENTS OF THE INVENTION

The present invention provides optically active glass and optical fibers having reduced photodarkening properties. More particularly, the optically active glass according to the invention allows the reduction and even the substantial elimination of the photodarkening phenomenon observed over time in such optically active glass and fibers when the active ions are pumped or inverted.

Although the present invention is particularly applied to optical fiber cores in the examples below, it will be understood that it could also be useful to optically active glass itself or different types of waveguides such as planar waveguides, birefringent waveguide such as panda fiber, photonics crystal fiber, or any other waveguide or combination of them.

It is also understood that the invention could apply to any glass doped with elements that causes photodarkening. Therefore, it is independent of the way the elements are implemented in the glass such as a ring doping, confined spatial distribution, and a plurality of point distribution, or any other implementations or combinations of them.

The expression "optically active" in the sense of the invention is understood to refer to a material used to amplify or generate light.

An active ion in the sense of the invention is an ion which is used to generate or amplify light. Preferably, the active ion(s) is (are) chosen from rare-earth ion(s). However, other active ions could also be used, such as for example titanium or chromium.

Light refers to radiation at frequencies in the ultra-violet, visible and infrared part of the electromagnetic spectrum.

In accordance with a preferred embodiment of the invention there is provided an optically active glass made of silica and including at least one active ion inducing a photodarkening effect in optical properties of the glass.

The present invention is particularity directed to optically active glass in which the chosen active ion inducted a photodarkening effect in the optical properties of the glass. As explained above, the photodarkening effect is understood to refer to the degradation of the optical properties of the glass over time, such as an increase in intrinsic loss, under light illumination or propagation of light. Typically, but not exclusively, it is related to the formation of photoinduced structural transformations in the glass inducing excess power losses. Examples of rare-earth ions inducing a photodarkening effect in optical properties of a silica glass include ytterbium, thulium, europium, cerium and praseodymium. However, any other dopant having photodarkening properties could be present in the glass of the present invention. In particular embodiments of the invention, the optically active glass is doped with ytterbium or thulium, or a combination thereof, in their oxide form $Yb_2O_3$ and $Tm_2O_3$.

The optically active glass according to the invention preferably includes from about 50 to 98 mol % of silica. Preferably also, the active ion is a rare earth ion which is present in the glass as its oxide form in an amount of from 0.01 to about 5 mol % of the oxide. Even more preferably, the active ion is present in an amount of from about 0.3 to 5 mol % of the oxide.

It has been found that by including phosphorus oxide in the optically active glass in an amount of from about 1 to 30 mol % the photodarkening effect is reduced or even substantially eliminated. This is a surprising aspect of the present invention as phosphorus has never been linked in the prior art to reduction of photodarkening.

As used therein the term "about" used to refer to the preferred quantities of the compounds present in the optically active glass according to the invention, is used to express the uncertainty of measurements. This uncertainty may be up to ±0.2 mol %.

In addition to the elements mentioned above, the optically active glass or a waveguide core made of such optically active glass may include one or several additional co-dopants affecting further the properties of the glass. The additional co-dopants which may for example be index raising elements, index decreasing elements or a combination of index raising and index decreasing elements, such as an oxide of Al, La, Lu, P, Ge, Ti, F, B or a combination thereof. Such co-dopant is usually present within the range of 0.01 mol % to about 30 mol %. Preferably, the co-dopant is $Al_2O_3$. More preferably, $Al_2O_3$ is present in an amount of about 1 mol %. For a waveguide core, $Al_2O_3$ is preferably present in the inner core region.

Moreover, when the optically active glass form a waveguide core, its outer region may also include at least one dopant that is composed of index raising elements which may be the same or different from those used in the inner core region, but in an amount such as to make the refractive index of the outer core region lower than that of the inner core region. Suitable outer core dopants are, for example, oxides of Al, La, Lu, P, Ge, Ti, F, B or combinations thereof.

Moreover, the outer core region may be formed of a plurality of sub-regions which are doped, at least in part, with index raising elements so that the overall outer core region has a refractive index lower than that of the inner core region. One or more of such sub-regions may have no dopant at all and be made-up of pure silica.

A preferred optically active glass according to the present invention will include about 90 mol % of silica, about 1 mol % of $Yb_2O_3$, about 1 mol % of $Al_2O_3$, and about 8 mol % of phosphorus oxide. Such a composition will provide efficient photodarkening reduction in optical properties of the glass.

In accordance with another preferred embodiment of the invention, there is also provided an optical fiber having reduced photodarkening properties. Such an optical fiber includes an optically active glass as described hereinabove. The optically active glass may be present in any part of the optical fiber. Preferably, the optically active glass constitutes the core of the fiber. Furthermore, this core may be surrounded by at least one cladding.

The cladding is usually made of pure silica, but other type of dopants could also be included in the cladding such as for example fluorine oxide.

The optical fiber may also include a double-cladding surrounding the core according to the disclosure of U.S. Pat. No. 4,815,079. The double-cladding consists in an inner cladding directly surrounding the waveguide core to produce mode perturbations in the cladding.

Figure 1:
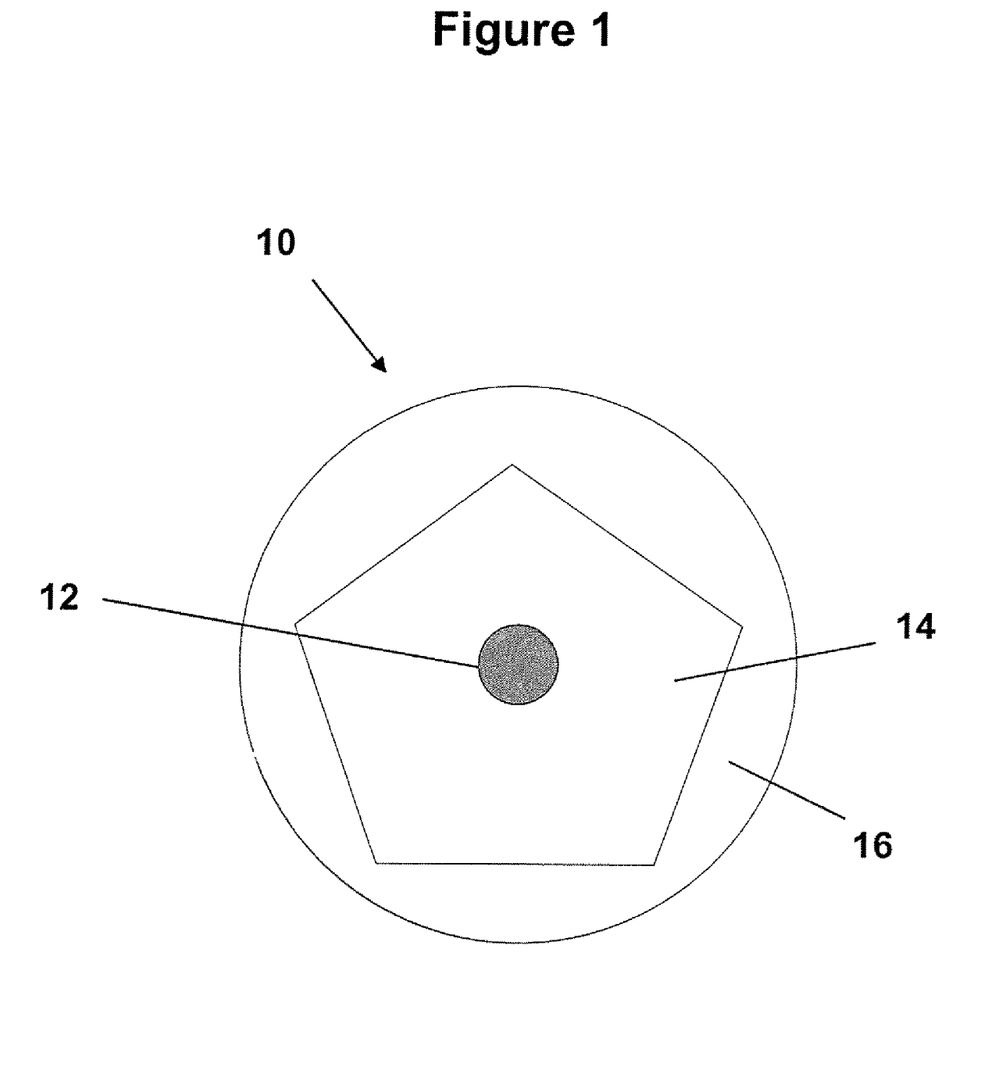
FIG. 1 is a cross-sectional view of an optical fiber according to an embodiment of the present invention.

FIG. 1 shows an example of a double-clad optical fiber according to a preferred embodiment of the invention. As seen in this figure, the optical fiber 10 is provided with a waveguide core 12 including an optically active glass according to the invention. In this case, the core has a circular cross-section. The core extends centrally in the optical fiber 10. The core 12 is surrounded by an inner cladding 14 defining a pump guide for receiving pump energy and transferring pump energy to the core 12. The inner-cladding 14 shown in this figure has a pentagonal cross-section. The double-clad optical fiber 10 is also provided with an outer cladding 16 surrounding the inner cladding 14. It is of course understood that the embodiment of FIG. 1 is shown by way of example only and is in no way considered limitative to the scope of present invention.

The optical fiber of the present invention can be fabricated by any suitable method such as VAD, MCVD or OVD, PCVD or a combination thereof or any other method used to fabricate optical fiber. Good results have for example been obtained with MCVD (see for example Izama, T. and S. Sudo, Optical Fibers: Materials and Fabrication, KTK Scientific Publishing, Company, Tokyo: 1987).

In accordance with a further preferred embodiment of the invention, there is also provided a method for reducing a photodarkening effect in optical properties of optically active silica glass including at least one active ion inducing said photodarkening effect. This method consists in doping the silica glass with an effective amount of phosphorus oxide for reducing the photodarkening effect. More particularly, the method preferably applies to silica waveguide cores including from 0.01 to about 5 mol % of at least one rare-earth active ion inducing a photodarkening effect. The phosphorus oxide used to dope the silica glass is preferably used in an amount of from about 1 to 30 mol %. The addition of phosphorus oxide to the waveguide core allows reducing and even substantially eliminating the photodarkening effect induced by the rare-earth element.

The phosphorus oxide may be introduced into the optically active glass by any standard method known in the field of manufacturing optical fibers. For example, the phosphorus oxide is introduced into the glass using the method described in Izama, T. and S. Sudo, Optical Fibers: Materials and Fabrication, KTK Scientific Publishing Company, Tokyo: 1987.

The method according to the invention preferably applies to optically active glass having the particularities as described hereinabove. Accordingly, the method is more preferably applies to an optically active glass wherein the rare-earth ion is ytterbium present in the form of its oxide $Yb_2O_3$. However, the method is not limited to ytterbium only and could be applied to any optically active glass or optical fiber wherein the active rare-earth ion present in the glass induces a photo-darkening effect.

EXAMPLE(S)

An optical fiber including a silica glass according to the invention and about 1 mol % of $Yb_2O_3$, about 1 mol % of $Al_2O_3$ and about 8 mol % of $P_2O_5$ has been manufactured and tested for its anti-darkening properties.

Figure 2:
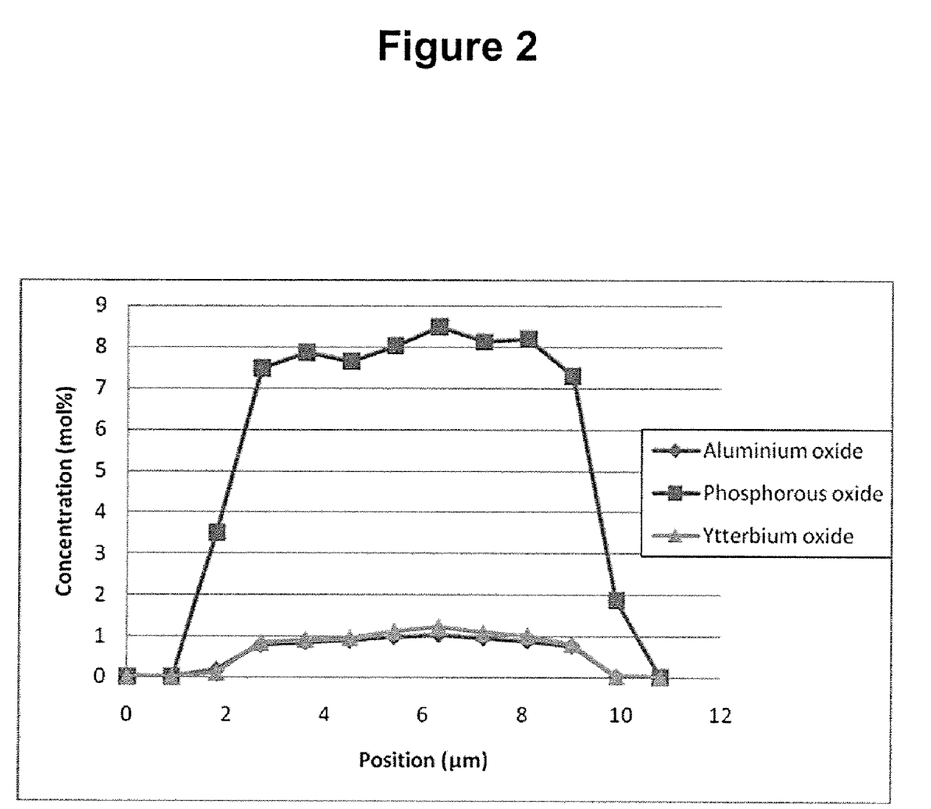
FIG. 2 is a diagram showing the radial profile of an optical fiber according to an embodiment of the invention.

FIG. 2 shows the radial profile of this specific optical fiber. As seen in the diagram the concentration of ytterbium, aluminum and phosphorus oxides are relatively stable at the target values mentioned above throughout the inner region of the core and tapers off in the outer region.

Photodarkening can be measured in optical fiber as referenced in J. J. Koponen, M. J. Söderlund, H. J. Hoffman, S. K. T. Tammela, "Measuring photodarkening from single-mode ytterbium doped silica fibers," Opt. Expr. 14 (24), 11539-11544 (2006). The increase of background loss of the active region of the fiber can be measured after light has been launched into the fiber.

Figure 3:
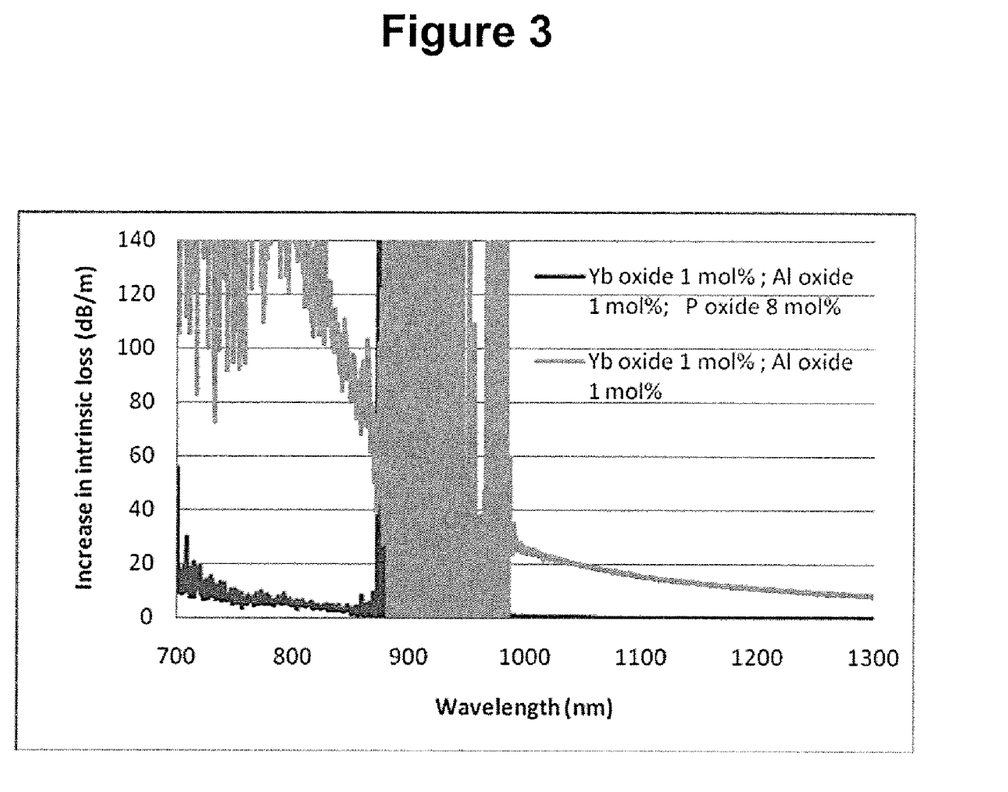
FIG. 3 is a diagram comparing the photodarkening measured in an optical fiber codoped with phosphorus oxide or not.

FIG. 3 shows the increase in background loss of a fiber having the composition detailed hereinabove, i.e. a two ytterbium (Yb) singlemode fiber, after 200 mW of light power at 977 nm was launched in a 5 cm sample. This fiber codoped with phosphorous (P) oxide shows very significant decrease in background loss compared to a reference fiber codoped with aluminum only.

Figure 4:
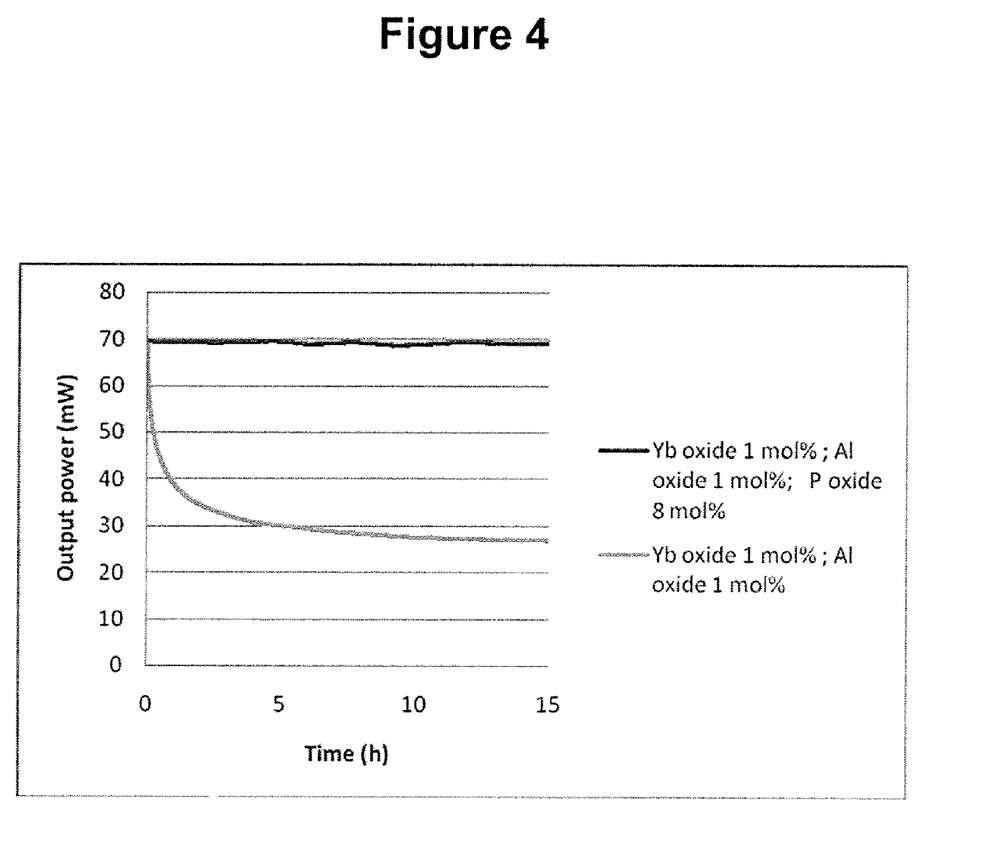
FIG. 4 is a diagram comparing the output power measured over time in an optical amplifier made with a fiber codoped with phosphorous or not.

Furthermore, a significant difference in output power efficiency is measured when the fiber codoped with phosphorus oxide is used in amplifier configuration. FIG. 4 shows the output power at 1065 nm of an amplifier done with Yb singlemode mode core pumped with 200 mW of light power at 977 nm with an input signal of 6 mW at 1064 nm. The fiber codoped with phosphorous shows not degradation of output power over time compared to the fiber codoped with aluminum only.

Of course, numerous modifications could be made to the above-described embodiments without departing from the scope of the invention, as apparent to a person skilled in the art. While a specific embodiment of the present invention has been described and illustrated, it will be apparent to those skilled in the art that numerous modifications and variations can be made without departing from the scope of the invention as defined in the appended claims.

The invention claimed is:

1. An optically active glass comprising:
   from about 50 to 98 mol % of silica;
   from 0.01 to about 5 mol % of at least one active ion other than erbium for generating or amplifying light, said active ion inducing a photodarkening effect in optical properties of said optically active glass; and
   an effective amount of phosphorus oxide for reducing said photodarkening effect.

2. The optically active glass according to claim 1, wherein said at least one active ion is a rare-earth ion.

3. The optically active glass according to claim 2, wherein said rare-earth ion is ytterbium or thulium.

4. The optically active glass according to claim 1, wherein said phosphorus oxide is present in an amount of from about 1 to 30 mol %.

5. The optically active glass according to claim 1, further comprising from 0.01 to about 30 mol % of at least one co-dopant.

6. The optically active glass according to claim 5, wherein the co-dopant is an oxide of Al, an oxide of La, an oxide of Lu, an oxide of P, an oxide of Ge, an oxide of Ti, an oxide of F, an oxide of B or a mixture thereof.

7. The optically active glass according to claim 6, wherein the co-dopant is $Al_2O_3$.

8. The optically active glass according to claim 7, wherein $Al_2O_3$ is present in an amount of about 1 mol %.

9. The optically active glass according to claim 1, wherein said phosphorus oxide substantially eliminates said photodarkening effect.

10. An optical fiber comprising an optically active glass as defined in claim 1.

11. The optical fiber according to claim 10, wherein the optically active glass is comprised in a core and said core is surrounded by at least one cladding.

12. The optical fiber according to claim 11, wherein each of said at least one cladding consists essentially of pure silica or silica doped with at least one rare-earth element.

13. The optical fiber according to claim 11, wherein the optically active glass further comprises from 0.01 to about 30 mol % of at least one co-dopant.

14. The optical fiber according to claim 13, wherein the co-dopant is an oxide of Al, an oxide of La, an oxide of Lu, an oxide of P, an oxide of Ge, an oxide of Ti, an oxide of F, an oxide of B or a mixture thereof.

15. The optical fiber according to claim 14, wherein the co-dopant is $Al_2O_3$.

16. The optical fiber according to claim 15, wherein $Al_2O_3$ is present in an amount of about 1 mol %.

17. The optical fiber according to claim 10, wherein said phosphorus oxide substantially eliminates said photodarkening effect.

18. An optically active glass comprising:
about 90 mol % of silica;
about 1 mol % of $Yb_2O_3$;
about 1 mol % of $Al_2O_3$; and
about 8 mol % of phosphorus oxide.

19. An optical fiber comprising an optically active glass as defined in claim 18.

20. The optical fiber according to claim 19, wherein the optically active glass is comprised in a core and said core is surrounded by at least one cladding.

21. A method for reducing a photodarkening effect in optical properties of an optically active silica glass comprising at least one active ion other than erbium for generating or amplifying light, said at least one active ion inducing said photodarkening effect, the method comprising a step of doping the silica glass with an effective amount of phosphorus oxide.

22. The method of claim 21, wherein said at least one active ion is ytterbium or thulium.

23. The method of claim 21, wherein said optically active silica glass comprises from 0.01 to about 5 mol % of $Yb_2O_3$ and the effective amount of phosphorus oxide is of from about 1 to 30 mol %.

* * * * *

UNITED STATES PATENT AND TRADEMARK OFFICE
CERTIFICATE OF CORRECTION

| | | |
|---|---|---|
| PATENT NO. | : 8,055,115 B2 | Page 1 of 1 |
| APPLICATION NO. | : 11/773869 | |
| DATED | : November 8, 2011 | |
| INVENTOR(S) | : Morasse et al. | |

It is certified that error appears in the above-identified patent and that said Letters Patent is hereby corrected as shown below:

Title Page, Column 1, Section 75;

The fourth inventor's name is missing and should read as follows: Stephane Chatigny, Saint-Redempteur (CA)

Signed and Sealed this
Tenth Day of April, 2012

David J. Kappos
*Director of the United States Patent and Trademark Office*